United States Patent
McQuiston et al.

(10) Patent No.: US 11,725,594 B2
(45) Date of Patent: Aug. 15, 2023

(54) HYBRID ELECTRIC ENGINE SPEED REGULATION

(71) Applicant: General Electric Company, Schenectady, NY (US)

(72) Inventors: Robert Jon McQuiston, Cincinnati, OH (US); Cameron Roy Nott, Farfield, OH (US); Stefan Joseph Cafaro, Maineville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/155,814

(22) Filed: Jan. 22, 2021

(65) Prior Publication Data

US 2022/0065177 A1   Mar. 3, 2022

Related U.S. Application Data (60) Provisional application No. 63/072,573, filed on Aug. 31, 2020.

(51) Int. Cl.
*F02C 9/00*   (2006.01)
*F02C 9/28*   (2006.01)

(52) U.S. Cl.
CPC ............ *F02C 9/28* (2013.01); *F05D 2220/76* (2013.01)

(58) Field of Classification Search
None
See application file for complete search history.

(56) References Cited

U.S. PATENT DOCUMENTS

| | | | |
|---|---|---|---|
| 3,686,485 A | * | 8/1972 | Wiley ................... G06G 7/70 701/99 |
| 5,915,917 A | | 6/1999 | Eveker et al. |
| 6,010,303 A | | 1/2000 | Feulner |
| 6,059,522 A | | 5/2000 | Gertz et al. |
| 6,979,979 B2 | | 12/2005 | Xu et al. |
| 8,866,318 B2 | | 10/2014 | Langford et al. |
| 9,267,438 B2 | | 2/2016 | Dooley et al. |
| 9,428,267 B2 | | 8/2016 | DeVita et al. |
| 9,441,547 B2 | | 9/2016 | Cai et al. |
| 9,561,860 B2 | | 2/2017 | Knapp et al. |
| 9,630,510 B2 | | 4/2017 | Sukumaran et al. |

(Continued)

FOREIGN PATENT DOCUMENTS

| CN | 103835881 B | 9/2016 |
|---|---|---|
| JP | 5923515 B2 | 5/2016 |

(Continued)

*Primary Examiner* — Katheryn A Malatek
(74) *Attorney, Agent, or Firm* — Dority & Manning, P.A.

(57) ABSTRACT

A method for operating a hybrid-electric gas turbine engine is provided. The method includes: receiving data indicative of an actual rotational speed of a shaft; calculating an error between the actual rotational speed of the shaft and a commanded rotational speed of the shaft; providing the calculated error to a fuel flow control circuit operable with a fuel delivery system of the hybrid-electric propulsion engine; providing the calculated error to an electric machine control circuit operable with an electric machine of the hybrid-electric propulsion engine, the electric machine drivingly coupled to the shaft; and modifying a torque on the shaft from the electric machine with the electric machine control circuit based on the calculated error.

17 Claims, 5 Drawing Sheets

(56) References Cited

U.S. PATENT DOCUMENTS

| | | |
|---|---|---|
| 9,643,729 B2 | 5/2017 | Walter-Robinson |
| 9,828,917 B2 | 11/2017 | Klonowski et al. |
| 9,889,746 B2 | 2/2018 | Wolff et al. |
| 10,023,319 B2 | 7/2018 | Teicholz et al. |
| 10,260,471 B2 | 4/2019 | Huang |
| 10,308,353 B2 | 6/2019 | Swann |
| 10,392,119 B2 | 8/2019 | Niergarth et al. |
| 10,435,165 B2 | 10/2019 | Swann et al. |
| 10,436,059 B2 | 10/2019 | Liu et al. |
| 10,442,547 B2 | 10/2019 | Miller et al. |
| 10,450,886 B2 | 10/2019 | Sennoun |
| 10,569,759 B2 | 2/2020 | Gansler et al. |
| 10,644,630 B2 | 5/2020 | Smith et al. |
| 10,676,199 B2 | 6/2020 | Hon et al. |
| 10,711,693 B2 | 7/2020 | Miller et al. |
| 10,737,798 B2 | 8/2020 | Misfeldt |
| 2005/0225303 A1 | 10/2005 | Xu et al. |
| 2010/0138089 A1 | 6/2010 | James |
| 2013/0086919 A1 | 4/2013 | Dooley et al. |
| 2013/0247579 A1 | 9/2013 | Morawski et al. |
| 2015/0321752 A1 | 11/2015 | Trull et al. |
| 2016/0325826 A1 | 11/2016 | Swann |
| 2017/0044989 A1 | 2/2017 | Gemin et al. |
| 2017/0057650 A1 | 3/2017 | Walter-Robinson |
| 2017/0175565 A1 | 6/2017 | Sennoun |
| 2017/0226933 A1 | 8/2017 | Klonowski et al. |
| 2017/0248080 A1* | 8/2017 | Chevalier ................. F02C 9/28 |
| 2018/0065755 A1 | 3/2018 | Teicholz et al. |
| 2018/0141674 A1 | 5/2018 | Bailey et al. |
| 2018/0194483 A1 | 7/2018 | Schwoller |
| 2018/0319283 A1 | 11/2018 | Battin et al. |
| 2018/0354631 A1 | 12/2018 | Adibhatla et al. |
| 2018/0354632 A1 | 12/2018 | Hon et al. |
| 2018/0370646 A1 | 12/2018 | Hon et al. |
| 2019/0001955 A1* | 1/2019 | Gansler ................. B60W 20/10 |
| 2019/0003398 A1 | 1/2019 | Gibson et al. |
| 2019/0165708 A1 | 5/2019 | Smith et al. |
| 2019/0186284 A1 | 6/2019 | Orkiszewski |
| 2019/0345837 A1 | 11/2019 | Bacic |
| 2019/0375512 A1* | 12/2019 | Ribeiro ................. B64D 35/02 |
| 2020/0010205 A1 | 1/2020 | Swann et al. |
| 2020/0056546 A1 | 2/2020 | Terwilliger et al. |
| 2020/0056551 A1 | 2/2020 | Epstein |
| 2020/0079513 A1 | 3/2020 | Pastouchenko et al. |
| 2020/0095939 A1 | 3/2020 | Epstein |
| 2020/0182158 A1 | 6/2020 | Kupratis |
| 2020/0248619 A1 | 8/2020 | Romero et al. |
| 2020/0284265 A1 | 9/2020 | Reepmeyer et al. |

FOREIGN PATENT DOCUMENTS

| | | | |
|---|---|---|---|
| WO | WO2008/049426 | A1 | 5/2008 |
| WO | WO2008/085535 | A2 | 7/2008 |
| WO | WO2014/085236 | A1 | 6/2014 |
| WO | WO2015/92269 | A1 | 6/2015 |

* cited by examiner

HYBRID ELECTRIC ENGINE SPEED REGULATION

CROSS-REFERENCE TO RELATED APPLICATION

This application is a non-provisional application claiming the benefit of priority under 35 U.S.C. § 119(e) to U.S. Provisional Application No. 63/072,573, filed Aug. 31, 2020, which is hereby incorporated by reference in its entirety.

FIELD

The present subject matter relates generally to a system and method for a hybrid-electric engine to regulate a rotational speed of the engine.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

Hybrid electric propulsion systems are being developed to improve an efficiency of the conventional commercial aircraft. Various hybrid electric propulsion systems include an electric machine driven by one of the aircraft engines. The inventors of the present disclosure have come up with various configurations and/or methods to improve the currently-known hybrid electric propulsion systems.

BRIEF DESCRIPTION

Aspects and advantages of the invention will be set forth in part in the following description, or may be obvious from the description, or may be learned through practice of the invention.

In one exemplary aspect of the present disclosure, a method for operating a hybrid-electric gas turbine engine is provided. The method includes: receiving data indicative of an actual rotational speed of a shaft; calculating an error between the actual rotational speed of the shaft and a commanded rotational speed of the shaft; providing the calculated error to a fuel flow control circuit operable with a fuel delivery system of the hybrid-electric propulsion engine; providing the calculated error to an electric machine control circuit operable with an electric machine of the hybrid-electric propulsion engine, the electric machine drivingly coupled to the shaft; and modifying a torque on the shaft from the electric machine with the electric machine control circuit based on the calculated error.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

It will be appreciated that any reference numerals used in this chapter may not refer to the same components and features associated with the same reference numerals in other chapters.

The present disclosure generally relates to a system and method for regulating a rotational speed of a shaft of a gas turbine engine. For example, the system and method of the present disclosure may regulate a rotational speed of an low pressure shaft of a gas turbine engine, which drives a fan of the gas turbine engine.

The system and method disclosed utilizes an electric machine rotatable with the shaft, as well as a control scheme that includes a fuel flow control circuit and an electric machine control circuit. The fuel flow control circuit may generally be used to regulate the shaft speed by increasing or decreasing a fuel flow to the engine to control for the shaft speed. By contrast, the electric machine control circuit may address oscillations in the shaft speed above and below a set speed for the shaft by adding or extracting relatively small amounts of power to or from the shaft.

In certain exemplary aspects, the system and method may receive data indicative of an actual rotational speed of the shaft and calculate an error relative to a desired rotational speed of the shaft. The error may be provided to both the fuel flow control circuit and the electric machine control circuit. The electric machine control circuit may provide a command to, e.g., an electric machine power source, to provide power to the electric machine to modify a torque of the shaft from the electric machine based on the calculated error. Additionally, or alternatively, the electric machine control circuit may provide a command to, e.g., the electric machine to extract power from the shaft of the electric machine based on the calculated error.

A system and method of the present disclosure may normalize the rotational speed of the shaft during operation. This may reduce cycles of certain components (e.g., within the fuel system) and further may improve fuel consumption for the engine.

Figure 1:
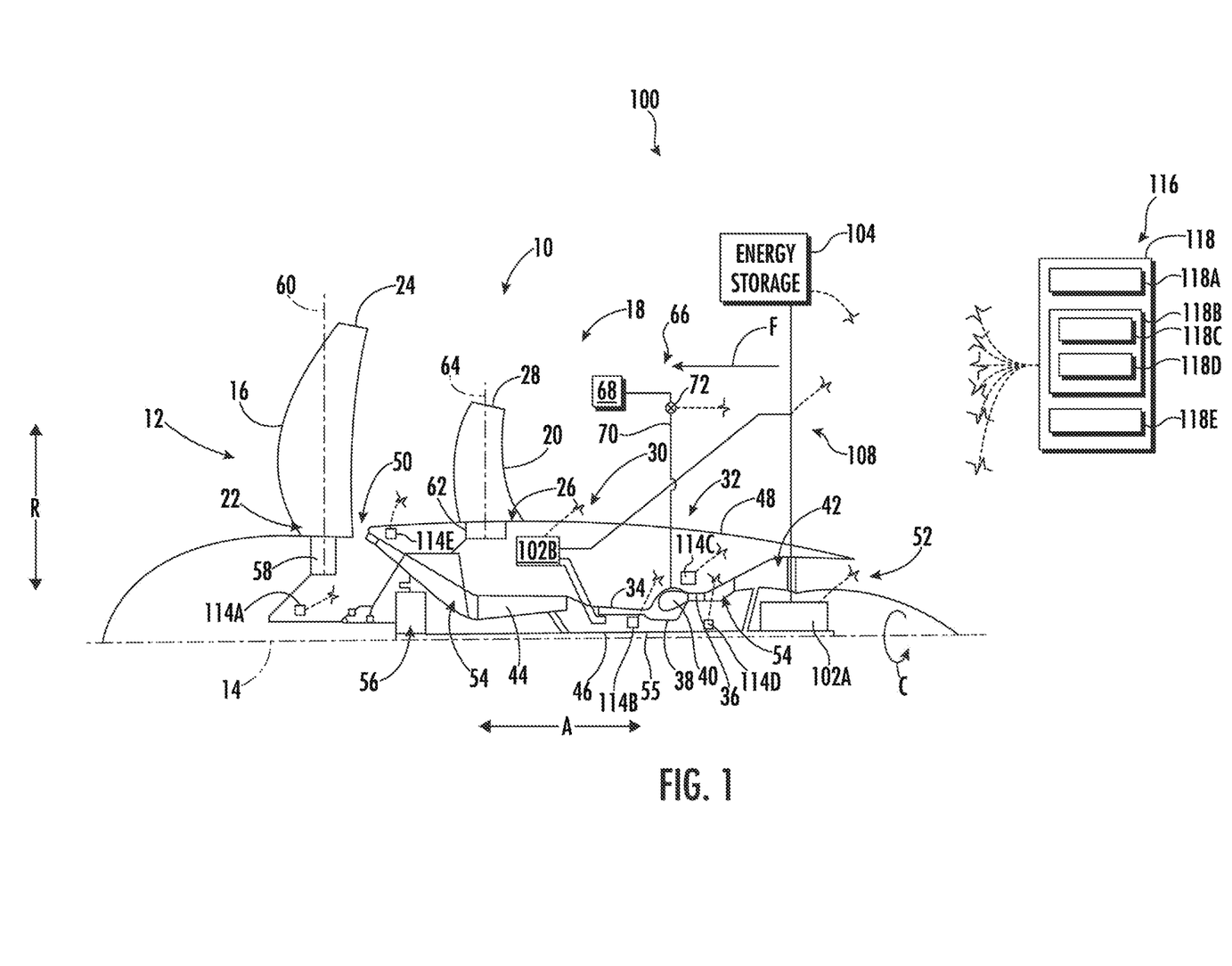
FIG. 1 is a schematic, cross-sectional view of a gas turbine engine in accordance with an exemplary embodiment of the present disclosure.

Referring now to FIG. 1, a cross-sectional view of an exemplary embodiment of a gas turbine engine as may incorporate one or more inventive aspects of the present disclosure is provided. In particular, the exemplary gas turbine engine of FIG. 1 is a configured as a single unducted rotor engine 10 defining an axial direction A, a radial direction R, and a circumferential direction C. As is seen from FIG. 1, the engine 10 takes the form of an open rotor propulsion system and has a rotor assembly 12 which includes an array of airfoils arranged around a central longitudinal axis 14 of engine 10, and more particularly includes an array of rotor blades 16 arranged around the central longitudinal axis 14 of engine 10.

Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14.

The rotor blades 16 are arranged in typically equally spaced relation around the centerline 14, and each blade has a root 22 and a tip 24 and a span defined therebetween. Similarly, the vanes 20 are also arranged in typically equally spaced relation around the centerline 14, and each has a root 26 and a tip 28 and a span defined therebetween. The rotor assembly 12 further includes a hub 44 located forward of the plurality of rotor blades 16.

Additionally, the engine 10 includes a turbomachine 30 having a core (or high pressure/high speed system) 32 and a low pressure/low speed system. It will be appreciated that as used herein, the terms "speed" and "pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The core 32 generally includes a high-speed compressor 34, a high speed turbine 36, and a high speed shaft 38 extending therebetween and connecting the high speed compressor 34 and high speed turbine 36. The high speed compressor 34, the high speed turbine 36, and the high speed shaft 38 may collectively be referred to as a high speed spool of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool.

The low speed system similarly includes a low speed turbine 42, a low speed compressor or booster, 44, and a low speed shaft 46 extending between and connecting the low speed compressor 44 and low speed turbine 42. The low speed compressor 44, the low speed turbine 42, and the low speed shaft 46 may collectively be referred to as a low speed spool 55 of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52, and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18, and provides a path for incoming atmospheric air to enter the turbomachinery flowpath 54 (and compressors 44, 34, combustion section 40, and turbines 36, 42) inwardly of the guide vanes 28 along the radial direction R. Such a location may be advantageous for a variety of reasons, including management of icing performance as well as protecting the inlet 50 from various objects and materials as may be encountered in operation.

However, in other embodiments, the inlet 50 may be positioned at any other suitable location, e.g., aft of the vane assembly 18, arranged in a non-axisymmetric manner, etc.

As is depicted, the rotor assembly 12 is driven by the turbomachine 30, and more specifically, is driven by the low speed spool 55. More specifically, still, engine 10 in the embodiment shown in FIG. 1 includes a power gearbox 56, and the rotor assembly 12 is driven by the low speed spool 55 of the turbomachine 30 across the power gearbox 56. In such a manner, the rotating rotor blades 16 of the rotor assembly 12 may rotate around the axis 14 and generate thrust to propel engine 10, and hence an aircraft to which it is associated, in a forward direction F. For example, in certain embodiments, one or more engines configured in a manner similar to the exemplary engine 10 depicted in FIG. 1 may be incorporated in and utilized with the aircraft of FIGS. 1, 4, and/or 5.

The power gearbox 56 may include a gearset for decreasing a rotational speed of the low speed spool 55 relative to the low speed turbine 42, such that the rotor assembly 12 may rotate at a slower rotational speed than the low speed spool 55.

As briefly mentioned above the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 28. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature which may be useful in certain operating conditions such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc.; fixed-pitch blades 16, 20, or both; a direct-drive configuration (i.e., may not include the gearbox 56); etc. For example, in other exemplary embodiments, the engine 10 may be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts.

Additionally, or alternatively, in other exemplary embodiments, any other suitable gas turbine engine may be provided. For example, in other exemplary embodiments, the gas turbine engine may be a turboshaft engine, a turboprop engine, turbojet engine, etc. Moreover, for example, although the engine is depicted as a single unducted rotor engine, in other embodiments, the engine may include a multi-stage open rotor configuration, and aspects of the disclosure described hereinbelow may be incorporated therein.

Figure 2:
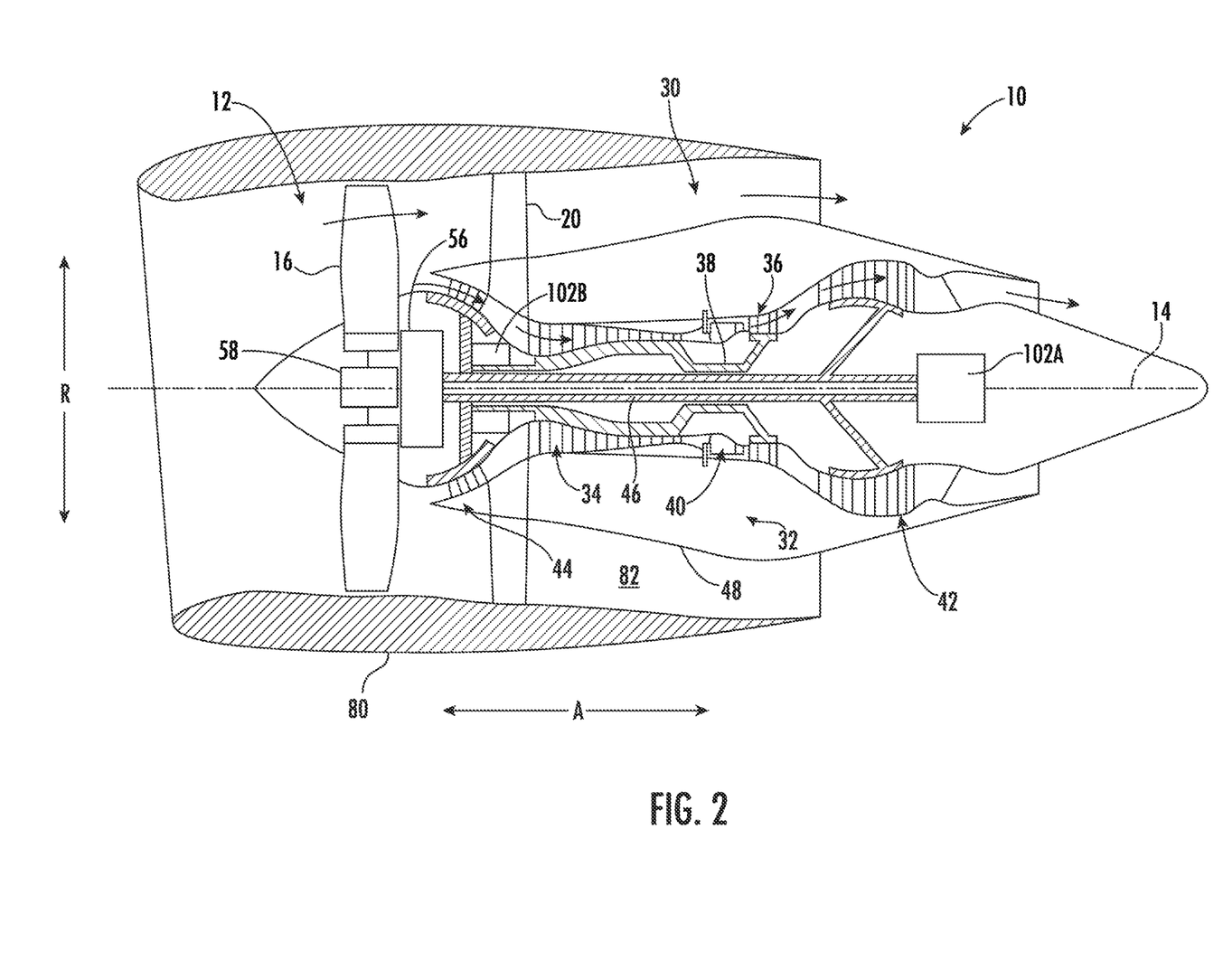
FIG. 2 is a schematic, cross-sectional view of a gas turbine engine in accordance with another exemplary embodiment of the present disclosure.

Further, still, in other exemplary embodiments, the engine 10 may be configured as a ducted turbofan engine. For example, referring briefly to FIG. 2, an engine 10 in accordance with another exemplary embodiment of the present disclosure is depicted. The exemplary embodiment of FIG. 2 may be configured in substantially the same manner as the exemplary engine 10 described above with respect to FIG. 1, and the same or similar reference numerals may refer to the same or similar parts. However, as will be appreciated, for the embodiment shown, the engine 10 further includes a nacelle 80 circumferentially surrounding at least in part the rotor assembly 12 and turbomachine 30, defining a bypass passage 82 therebetween.

Referring now back to FIG. 1, it will be appreciated that for the embodiment shown, the exemplary hybrid electric propulsion system further includes a fuel delivery system 66. The fuel delivery system 66 generally includes a fuel source 68 (which may be, e.g., a fuel tank of an aircraft including the engine 10), one or more fuel lines 70 extending between the fuel source 68 and the combustion section 40 of the engine 10, and a fuel valve 72. The fuel valve 72 is in fluid communication with the one or more fuel lines 70, configured to regulate a fuel flow through the one or more fuel lines 70 from the fuel source 68 to the combustion section 40. The fuel valve 72 may be referred to as, or configured as part of, a fuel metering unit ("FMU"), and may generally control a power output of the engine 10.

Moreover, it will further be appreciated that the engine is integrated with an electric power system 100. The electric power system 100 generally includes an electric machine 102 coupled to at least one of the high pressure system (or core 32) or the low pressure system, and an energy storage unit 104

Further, for the embodiment shown, the electric power system 100 includes an electric power bus 108 electrically connecting the various components of electric power system 100. The electric power bus 108 may be, e.g., one or more electrical lines arranged in any suitable configuration.

Referring still to the exemplary embodiment of FIG. 1, although not depicted, it will be appreciated that the exemplary electric power system may also include an auxiliary power unit. The auxiliary power unit, if included, may include a combustion engine driving an electric generator, and may be located remotely from the engine 10. For example, in at least certain exemplary embodiments, the auxiliary power unit, if provided, may be located within a fuselage of the aircraft utilizing the engine 10, e.g., at an aft end of the aircraft, and electrically coupled to the electric power bus 108.

Further, still, for the embodiment shown, the electric machine 102 of the electric power system 100 is an LP electric machine 102A coupled to the low pressure system of the engine. More specifically, for the embodiment shown, the LP electric machine 102A is embedded within the engine 10, at a location within or aft of the turbine section of the engine 10, and inward of the core airflow path 54 through the engine 10 along the radial direction R. It will be appreciated, however, that in other example embodiments, the LP electric machine 102A may additionally, or alternatively, be configured in the other suitable manner. For example, in other embodiments, the LP electric machine 102A may be embedded within a compressor section of the engine 10, may be located outward of core airflow path 54 along the radial direction R (and, e.g., within the cowl 48), etc.

Moreover, for the embodiment shown, the LP electric machine 102A is not the only electric machine 102 of the electric power system 100 integrated with the engine 10. More specifically, the electric power system 100 further includes an HP electric machine 102B coupled to the high-pressure system/core of the engine 10, and in electrical communication with the electric power bus 108. The HP electric machine 102B is, for the embodiment shown, also embedded within the engine 10 at a location inward of the core airflow path 54. However, for the embodiment shown, the HP electric machine 102B is located within the compressor section of the engine 10. It will be appreciated that in other embodiments, the HP electric machine 102B may alternatively be positioned outward of the core airflow path 54 along the radial direction R, driven through, e.g., a geared connection. For example, in certain embodiments, the HP electric machine 102B may be coupled to an accessory gearbox (not shown), which is in turn coupled to the high-pressure system of the engine 10.

In at least certain exemplary embodiments, the energy storage unit 104 may include one or more batteries. Additionally, or alternatively, the energy storage unit 104 may include one or more supercapacitor arrays, one or more ultracapacitor arrays, or both. In at least certain embodiments, the energy storage unit 104 may be configured to provide at least 5 kilowatts (kW) of energy to the electric power system 100, such as at least 50 kW, such as at least 50 kW, such as at least 250 kW, such as at least 300 kW, such as at least 350 kW, such as at least 400 kW, such as at least 500 kW, such as up to 5 megawatts (MVV), such as up to 10 megawatts (MVV). Further, the energy storage unit 104 may be configured to provide such electrical power for at least two minutes, such as at least three minutes, such as at least five minutes, such as up to an hour.

Referring still to FIG. 1, the exemplary electric power system 100 is operably connected to a controller 116. The controller 116 may be an engine controller for the engine 10 (e.g., a Full Authority Digital Engine Control controller), may be an aircraft controller, may be a controller dedicated to the electric power system 100, etc.

The controller 116 may be configured to receive data indicative of various operating conditions and parameters of the engine 10 during operation of the engine 10. For example, the engine 10 includes one or more sensors 114 configured to sense data indicative of various operating conditions and parameters of the engine 10, such as rotational speeds, temperatures, pressures, vibrations, etc. More specifically, however, for the exemplary embodiment depicted in FIG. 1, the one or more sensors 114 includes a first speed sensor 114A configured to sense data indicative of one or more parameters of the rotor assembly 12 (e.g., rotational speed, acceleration, torque on the rotor shaft driving the rotor assembly 12, etc.); a second sensor 114B configured to sense data indicative of the high pressure system (such as a rotational speed of high pressure spool 38, a compressor exit temperature, etc.); a third sensor 114C configured to sense data indicative of one or combustion section parameters (such as a temperature within the combustion section 40, a fuel flow to the combustion section 40, one or more pressures within or around the combustion section 40, etc.), one or more high pressure turbine parameters (such as turbine inlet temperature, a rotational speed of the high pressure turbine 36, etc.), or both; a fourth sensor 114D operable to sense data indicative of one or more parameters of the low pressure system (such as a rotational speed of the low pressure spool 55); and a fifth sensor 114E configured to sense data indicative of one or more variable geometry components (such as a position of one or more variable inlet guide vanes, outlet guide vanes, rotor blades 16, guide vanes 20, etc.).

Referring particularly to the operation of the controller 116, in at least certain embodiments, the controller 116 can include one or more computing device(s) 118. The computing device(s) 118 can include one or more processor(s) 118A and one or more memory device(s) 118B. The one or more processor(s) 118A can include any suitable processing device, such as a microprocessor, microcontroller, integrated circuit, logic device, and/or other suitable processing device. The one or more memory device(s) 118B can include one or more computer-readable media, including, but not limited to, non-transitory computer-readable media, RAM, ROM, hard drives, flash drives, and/or other memory devices.

The one or more memory device(s) 118B can store information accessible by the one or more processor(s) 118A, including computer-readable instructions 118C that can be executed by the one or more processor(s) 118A. The instructions 118C can be any set of instructions that when executed by the one or more processor(s) 118A, cause the one or more processor(s) 118A to perform operations. In some embodiments, the instructions 118C can be executed by the one or more processor(s) 118A to cause the one or more processor(s) 118A to perform operations, such as any of the operations and functions for which the controller 116 and/or the computing device(s) 118 are configured, the operations for operating an electric power system 100 (e.g., method 300), as described herein, and/or any other operations or functions of the one or more computing device(s) 118. The instructions 118C can be software written in any suitable programming language or can be implemented in hardware. Additionally, and/or alternatively, the instructions 118C can be executed in logically and/or virtually separate threads on processor(s) 118A. The memory device(s) 118B can further store data 118D that can be accessed by the processor(s) 118A. For example, the data 118D can include data indicative of power flows, data indicative of engine 10/aircraft operating conditions, and/or any other data and/or information described herein.

The computing device(s) 118 can also include a network interface 118E used to communicate, for example, with the other components of the engine 10, the aircraft incorporating the engine 10, the electric power system 100, etc. For example, in the embodiment depicted, as noted above, the engine 10 includes one or more sensors 114 for sensing data indicative of one or more parameters of the engine 10 and various accessory systems, and the electric power system 100 includes an energy storage unit 104, an LP electric machine 102A, an HP electric machine 102B, and an auxiliary power unit. The controller 116 is operably coupled to these components through, e.g., the network interface 118E, such that the controller 116 may receive data indicative of various operating parameters sensed by the one or more sensors 114 during operation, various operating conditions of the components, etc., and further may provide commands to control electrical flow of the electric power system 100 and other operating parameters of these systems, e.g., in response to the data sensed by the one or more sensors 114 and other conditions.

The network interface 118E can include any suitable components for interfacing with one or more network(s), including for example, transmitters, receivers, ports, controllers, antennas, and/or other suitable components. For example, in the embodiment shown, the network interface 118E is configured as a wireless communication network wirelessly in communication with these components (as is indicated by the dashed communication lines in FIG. 1).

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Referring still to FIG. 1, it will be appreciated that during operation of the system depicted, the engine 10 may drive the rotor assembly 12 with the low pressure system, and more specifically with the low pressure turbine 42 through the low pressure shaft 55, and for the embodiment shown further through the gearbox 56 and rotor shaft/fan shaft (not labeled). The low pressure turbine 42 is in turn driven by a flow of combustion gasses generated in the combustion section 40, flowing through the high pressure turbine 36. Accordingly, as a general matter, in order to control a rotational speed of the rotor assembly 12, the engine 10 controls a fuel flow through the fuel delivery system 66 to the combustion section 40 using, e.g., the fuel metering unit 72, as such will control an amount of/energy within the combustion gasses provided through the high pressure turbine 36 and low pressure turbine 42.

It will be appreciated, however, that control of the fuel flow alone may not provide for a desired level of control of the rotational speed of the rotor assembly 12. For example, the fuel system may include flow dynamics, such as non-linear flow dynamics that prevent the desired level of control. For example, referring briefly to FIG. 3, a chart is provided depicting an actual rotor speed (line 152) and a rotor speed command (at line 150), when the control scheme commands only the fuel flow to control the rotational speed of the rotor assembly 12. In the graph, time is presented on the "x-axis" at 154 (in seconds) and the rotational speed is presented on the "y-axis" at 156 (in revolutions per minute, relative to the rotor speed command at line 150).

Figure 3:
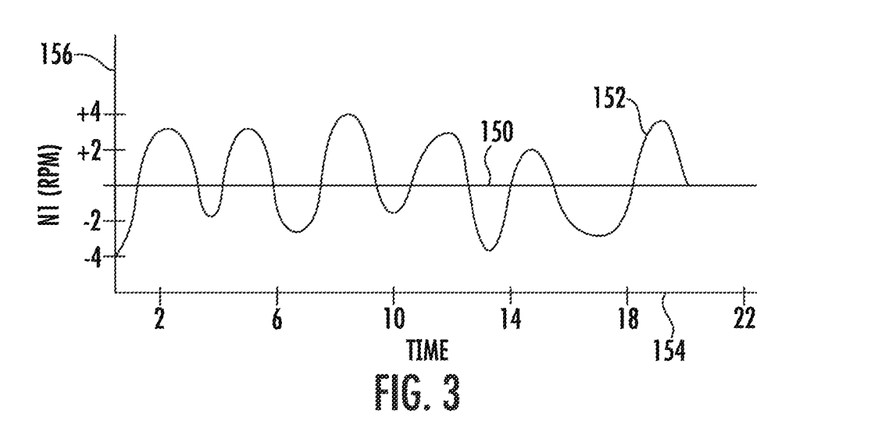
FIG. 3 is a graph depicting actual shaft speed and commanded shaft speed.

Depending on the rotor speed command, a variance in the rotor speed command and actual rotor speed may be at least about +/−0.06%, with a frequency of between 4 and 6 seconds. While such a variance is relatively small in magnitude, such may result in a relatively high number and frequency of control changes, which may reduce part life, use up additional energy, etc. Further, such may provide an undesirable and/or unfavorable response for the pilot and/or aircraft during a steady state condition, such as cruise.

In order to improve on this construct, the present disclosure utilizes aspects of the hybrid electric system to reduce and potentially effectively eliminate the variance between the rotor speed command and actual rotor speed. More specifically, referring now to FIG. 4, a schematic, flow diagram of a control scheme 200 as may be implemented by an engine controller to control a rotational speed of a rotor assembly is depicted. In certain exemplary embodiments, the control scheme 200 may be implemented using the controller 116 depicted in FIG. 1 to control the engine 10 and particularly the rotor assembly 12 of FIG. 1.

Figure 4:
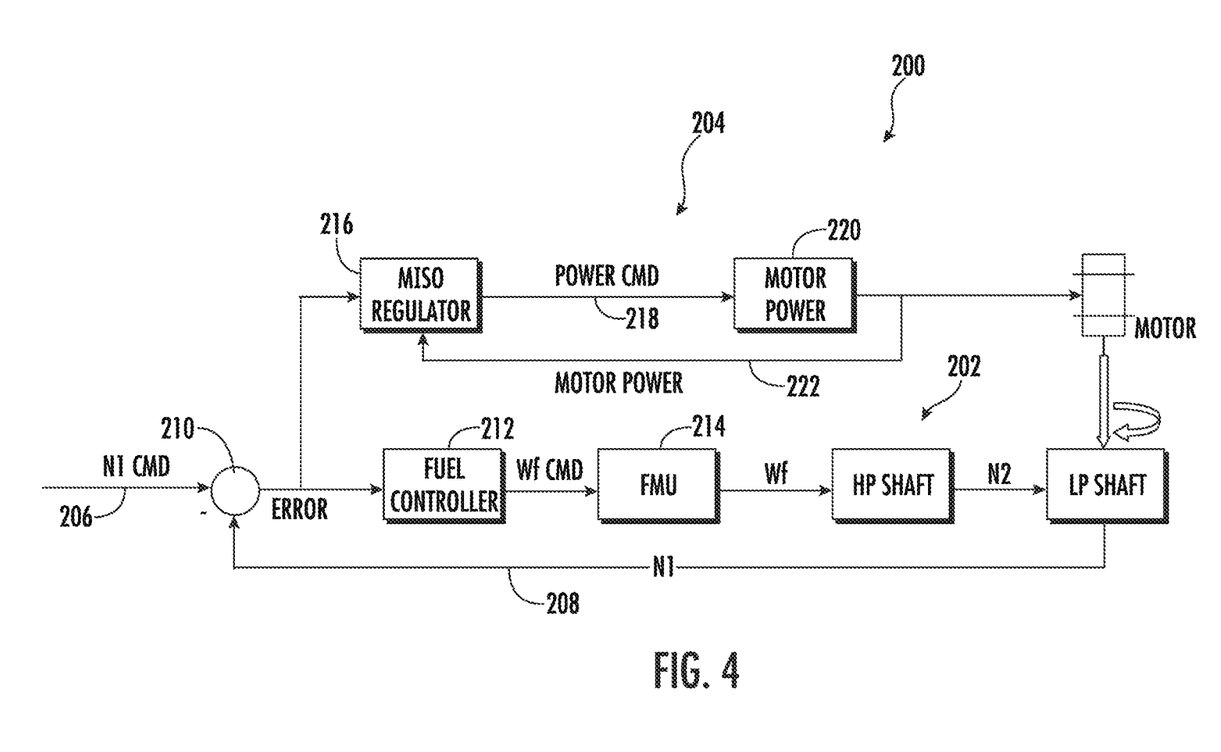
FIG. 4 is a schematic diagram of a control scheme for controlling shaft speed.

As shown, the exemplary control scheme 200 generally includes a fuel flow control circuit 202 and an electric machine control circuit 204. The control scheme 200 receives a rotational speed command, indicated by line 206, which may be received from an operator of an aircraft incorporating the engine being controlled. The control scheme 200 further receives an actual rotational speed, indicated at line 208, and calculates an error between the rotational speed command in the actual rotational speed at summation block 210.

Notably, as used herein, the data indicative of a rotational speed may refer to any suitable parameter for controlling an engine power and speed output. For example, the data may be speed data, may be pressure data (e.g., an overall pressure ratio, engine pressure ratio, etc.), or the like.

For the embodiment shown, the rotational speed command and actual rotational speed each refer to speeds of a low pressure shaft, which is drivingly connected to a rotor assembly, such as exemplary rotor summary 12 depicted FIG. 1. However, in other exemplary aspects, the rotational speed command and actual rotational speed may instead each refer to speeds of a rotor shaft of a rotor assembly, or other suitable shaft. For example, in other exemplary embodiments, the rotational speed command and actual rotational speed may instead each refer to speeds of a high pressure shaft of the engine (e.g., shaft 38 of the engines 10 of FIGS. 1 and 2).

The calculated error between the rotational speed command and the actual rotational speed is provided to both the fuel flow control circuit 202 and the electric machine control circuit 204.

The fuel flow control circuit 202 receives the calculated error with a fuel flow controller 212. The fuel flow controller 212 subsequently sends a command to a fuel valve 214 controlling a fuel flow to the engine. The fuel valve 212 may be part of, e.g., a fuel metering unit (see, e.g., exemplary valve 72 of fuel delivery system 66 of FIG. 1). The fuel flow to the engine generally controls the amount of combustion gases generated and/or the amount of energy in the combustion gases generated within the combustion section, which in turn controls a rotational speed of a high pressure system of the engine (including a high pressure turbine and a high pressure shaft), which in turn controls a rotational speed of a low pressure system (including a low pressure turbine and the low pressure shaft), which in turn directly controls a rotational speed of the rotor assembly.

Operating in parallel with the fuel flow control circuit 202 is the electric machine control circuit 204. The electric machine control circuit 204 similarly receives the calculated error between the rotational speed command and the actual rotational speed with an electric machine controller 216. Based at least in part on the received calculated error between the rotational speed command and the actual rotational speed, the electric machine controller 216 provides a power command, indicated at line 218, to an electric machine power distributor 220, which in turn provides the commanded amount of power to the electric machine, which may convert the received amount of electric power to mechanical power and provide such mechanical power directly to the low pressure shaft, which as stated, in turn controls a rotational speed of the rotor assembly.

Further, for the exemplary aspect depicted, the electric machine controller 216 is configured as a multiple input, single output controller configured to receive both the calculated error and a feedback of an actual amount of electrical power being provided to the electric machine, as indicated at line 222. In such a manner, the electric machine controller 216 may provide electrical power to the electric machine with a relatively high amount of accuracy. Further, with such a configuration, the controller 216 may minimize the amount of motor power required over time, to minimize the amount of power provided or power drawn.

However, in other exemplary embodiments, the electric machine controller 216 of the electric machine control circuit 204 may be a single input, single output controller, not receiving the feedback of the actual amount of electric power being provided. With such a configuration, the main feedback will be in the form of an updated error value calculated at summation 210 in response to receiving updated actual rotational speed data, indicated at line 208.

As will be appreciated, due to the nature of the fuel flow control circuit 202, the fuel flow control circuit 202 may operate at a lower frequency than the electric machine control circuit 204. For example, in at least certain exemplary aspects, the fuel flow control circuit 202 may operate at a first frequency and the electric machine control circuit 204 may operate at a second frequency, with the second frequency being higher than the first frequency. In certain exemplary aspects, the second frequency may be at least about five times higher than the first frequency, such as a at least about 10 times higher than the first frequency, such as up to 500 times higher than the first frequency. With such a configuration, there is less of a concern about the fuel flow control circuit 202 and the electric machine control circuit 204 competing with each other to control the rotational speed of the rotor assembly.

Further, given that relatively small changes are needed to normalize the rotational speed of the rotor assembly/low pressure shaft relative to the commanded speed, the amount of power being added to the low pressure shaft in the control scheme 200 of FIG. 4 may be relatively small. For example, in certain embodiments, the control scheme 200 may add less than about 30 horsepower ("hp") to the low pressure shaft with the electric machine through the electric machine control circuit 204, such as less than 30 hp, such as less than 25 hp, such as less than 20 hp, such as less than 15 hp, such as at least 1 hp, such as at least 3 hp, such as at least 5 hp, such as at least 10 hp.

It will be appreciated that with the exemplary engine depicted and described above with reference to FIG. 1, the electric machine being controlled may be utilized during the various flight operations. In such a manner, while the control scheme 200 is operating to normalize the rotor speed, the electric machine may already be adding power to the engine, or may already be extracting power from the engine. Accordingly, it will be appreciated that in at least certain exemplary aspects, the control scheme 200 may be configured to add power to the low pressure shaft with the electric machine in addition to the power already being provided.

Moreover, it will be appreciated that although in certain of the exemplary aspects of the present disclosure, the control scheme 200 may, in addition or in the alternative, extract power to normalize the rotational speeds of the rotor assembly. For example, instead of providing electric power to the electric machine, the control scheme 200 may provide a command to extract a certain amount of electric power to provide a similar result. Further, for embodiments in which the electric machine is already extracting power from the engine, the control scheme 200 may be configured reduce the amount of power extracted from the low pressure shaft with the electric machine relative to the power already being extracted.

Controlling a rotational speed of the low pressure shaft in accordance with exemplary aspect of the control scheme 200 depicted in FIG. 4 may result in a relatively low variance between the actual rotational speed of the rotor assembly or low pressure shaft and the commanded rotational speed of the rotor assembly or low pressure shaft. For example, in certain exemplary aspects, controlling the rotational speed of the low pressure shaft in accordance with exemplary aspect of the control scheme 200 depicted in FIG. 4 may result in a variance of less than about ±0.05%, such as less than about ±0.02%, when the engine is operated at a steady state, and when the low pressure system rotational speed is greater than about 500 revolutions per minute ("RPM"), such as greater than about a 1000 RPM, such as greater than about 1500 RPM, such as greater than about 2000 RPM, such as greater than about 2500 RPM, such as greater than about 3000 RPM, such as greater than about 3500 RPM, such as greater than about 4000 RPM, such as less than about 10,000 RPM.

It will be appreciated, however, that the exemplary control scheme 200 depicted in FIG. 4 is provided by way of example only. In other example aspects, any other suitable control schemes and methodologies may be provided. For example, although for the exemplary control scheme 200 depicted in FIG. 4 the electric machine is drivingly coupled to a low pressure shaft, and other exemplary aspects, the electric machine being controlled in accordance with the disclose control scheme 200 may be drivingly coupled to, e.g., a high pressure shaft, a fan shaft/rotor shaft, etc. In such a manner, the control scheme may be configured to control the rotational speed of the shaft drivingly coupled to the electric machine, or a different shaft. For example, when the electric machine being controlled by the control scheme 200 is coupled to the high pressure shaft, the control scheme may regulate a rotational speed of the high pressure shaft and to an extent the low pressure shaft. The data received by the control scheme indicative of an actual rotational speed may be for the shaft coupled to the electric machine.

Moreover, although the exemplary control scheme 200 is described as having separate control circuits and controllers (e.g., separate controllers 216, 212, 220), it will be appreciated that in certain exemplary aspects, the commands of control scheme 200 depicted and described with reference to FIG. 4 may each be incorporated into any other suitable configuration of controllers, such as into a single controller, such as into the exemplary controller 116 described above with reference to FIG. 1, etc.

Figure 5:
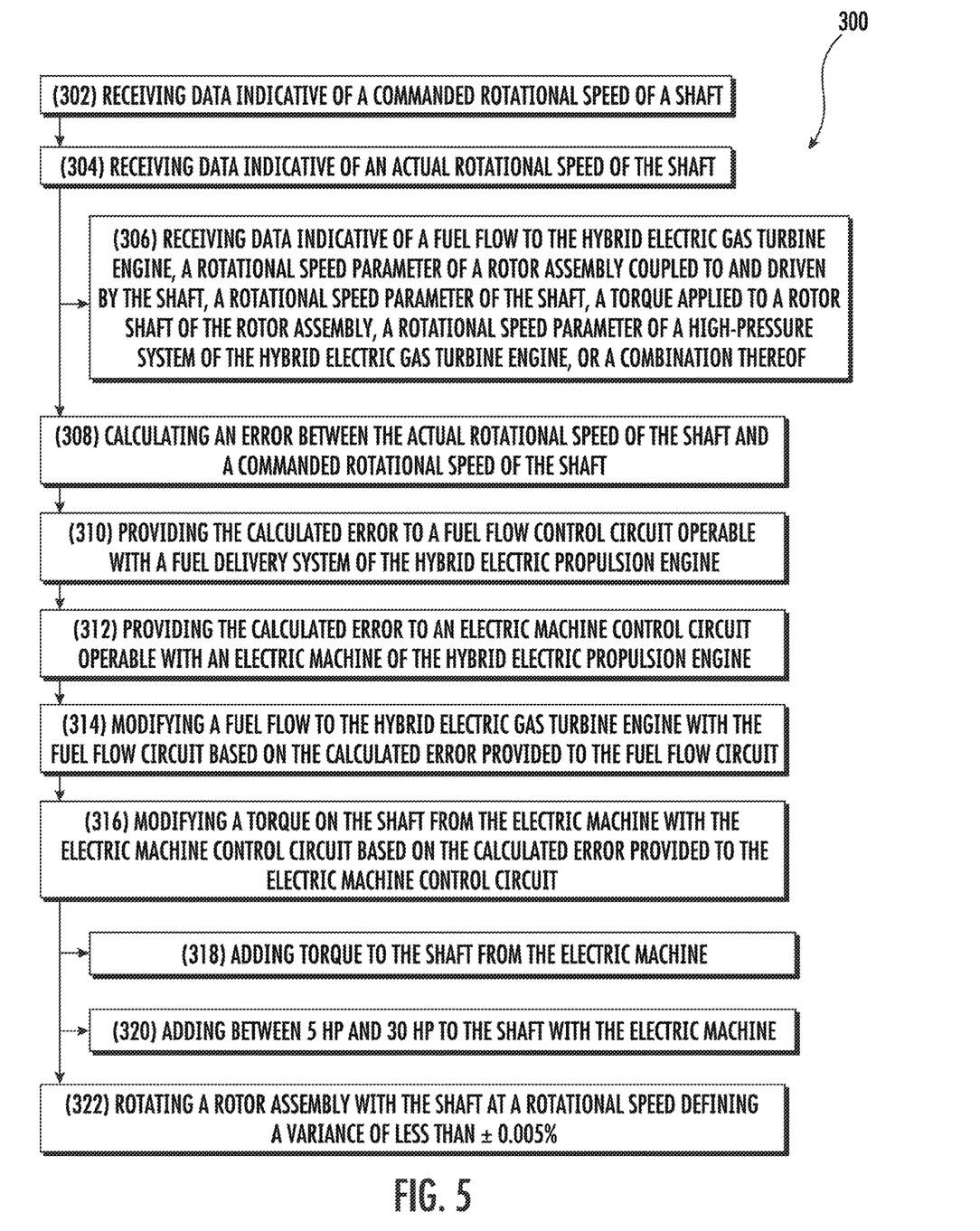
FIG. 5 is a flow diagram of a method for operating a gas turbine engine.

Referring now to FIG. 5, a flow diagram is provided of a method 300 for operating a hybrid electric gas turbine engine in accordance with an exemplary aspect of the present disclosure. The exemplary method 300 may utilize the exemplary control scheme 200 described above with reference FIG. 4 to control an engine configured in a similar manner as the exemplary engine 10 described above with reference FIG. 1.

The method 300 includes at (302) receiving data indicative of a commanded rotational speed of a shaft, and at (304) receiving data indicative of an actual rotational speed of the shaft. It will be appreciated that receiving data indicative of the commanded rotational speed of the shaft at (302) may include receiving data from an aircraft controller of an aircraft incorporating the engine, an engine controller, etc.

Further, for the exemplary aspect depicted, receiving data indicative of the actual rotational speed of the shaft at (304)

may include at (306) receiving data indicative of a fuel flow to the hybrid electric gas turbine engine, a rotational speed parameter of a rotor assembly coupled to and driven by the shaft, a rotational speed parameter of the shaft, a torque applied to a rotor shaft of the rotor assembly, a rotational speed parameter of a high-pressure system of the hybrid electric gas turbine engine, a pressure ratio parameter, or a combination thereof. The rotational speed parameter may include a rotational speed, a rotational acceleration, or a combination thereof. The pressure ratio parameter may include an overall pressure ratio, an engine pressure ratio, a compressor pressure ratio, or the like.

Further, as noted, the method 300 may be used to control an engine similar to the exemplary engine 10 described above with reference to FIG. 1. Accordingly, it will be appreciated that the shaft may be a low pressure shaft of the gas turbine engine, and further, the gas turbine engine may include a rotor assembly coupled to and driven by the low pressure shaft.

However, in other example aspects, any other suitable engine may be controlled in accordance with the exemplary method 300.

Referring still to FIG. 5, the method 300 further includes at (308) calculating an error between the actual rotational speed of the shaft and a commanded rotational speed of the shaft, at (312) providing the calculated error to an electric machine control circuit operable with an electric machine of the hybrid electric propulsion engine. The electric machine is, for the exemplary aspect depicted, drivingly coupled to the shaft.

Further, for the exemplary aspect of the method 300, the method further includes controlling a rotational speed of a shaft at least in part with a fuel flow control circuit operable with a fuel delivery system of the hybrid-electric propulsion engine. More specifically, for the exemplary aspect depicted, controlling the rotational speed of the shaft at least in part with the fuel flow control circuit operable with the fuel delivery system of the hybrid-electric propulsion engine includes at (310) providing the calculated error to a fuel flow control circuit operable with a fuel delivery system of the hybrid electric propulsion engine. Moreover, for the exemplary aspect depicted, controlling the rotational speed of the shaft at least in part with the fuel flow control circuit operable with the fuel delivery system of the hybrid-electric propulsion engine further includes at (314) modifying a fuel flow to the hybrid electric gas turbine engine with the fuel flow circuit based on the calculated error provided to the fuel flow circuit at (310). In certain exemplary aspects, modifying the fuel flow to the hybrid electric gas turbine engine at (314) may include modifying the fuel flow using a fuel metering unit.

Similarly, the exemplary method 300 additionally includes at (316) modifying a torque on the shaft from the electric machine with the electric machine control circuit based on the calculated error provided to the electric machine control circuit at (312). In the exemplary aspect depicted, modifying the torque on the shaft from the electric machine at (316) includes at (318) adding torque to the shaft from the electric machine. More specifically, in the exemplary aspect depicted, modifying the torque on the shaft from the electric machine at (316) includes at (320) adding between 5 hp and 30 hp to the shaft with the electric machine.

Notably, in certain exemplary aspects, modifying the torque on the shaft from the electric machine at (316) may include modifying the torque on the shaft from the electric machine relative to a baseline amount of torque being added to or extracted from the shaft. For example, the electric machine may be part of a hybrid-electric engine that is operating at a baseline level for the operating condition (e.g., a cruise operating mode), adding the baseline amount of torque to the shaft or extracting the baseline amount of torque from the shaft.

As will be appreciated, the process of controlling a rotational speed of the shaft with the fuel flow control circuit may be relatively slow. For example, in order to control the rotational speed of the shaft with the fuel flow control circuit, the amount of fuel being provided to the engine must be modified, and it takes time for such modification to change an amount of energy being provided to a high-pressure system of the engine, which in turn translates to a change in a rotational speed of a low-pressure system of the engine, such as a low-pressure shaft of the engine.

By contrast, the electric machine control circuit may operate relatively quickly, as (theoretically at least) a commanded modification of torque the shaft with the electric machine control circuit may be implemented at the speed of electricity through the electric machine control circuit to the electric machine drivingly coupled to the shaft. Accordingly, for example, it will be appreciated that for the exemplary aspect of the method 300 depicted in FIG. 5, the fuel flow control circuit may operate at a first frequency in the electric machine control circuit may operate at a second frequency. The second frequency may be higher than the first frequency, such as at least about five times higher than the first frequency, such as at least about 10 times higher than the first frequency, such as up to a thousand times higher than the first frequency.

Controlling a rotational speed of a rotor assembly drivingly coupled to the shaft in accordance of the exemplary aspect of the method 300 depicted in FIG. 5 may effectively reduce or eliminate a variance between the actual rotational speed of the shaft and the commanded rotational speed of the shaft. For example, in the exemplary aspect of the method 300 depicted in FIG. 5, the method 300 further includes at (322) rotating a rotor assembly with the shaft at a rotational speed defining a variance of less than ±0.005%, such as at a variance of less than about ±0.002%. Rotating the rotor assembly with the shaft at (322) may include rotating the rotor assembly with the shaft at a rotational speed of at least 500 RPM, such as at least a 1000 RPM, such as at least 1500 RPM, such as at least 2000 RPM, such as at least 2500 RPM, such as at least 3000 RPM, such as at least 3500 RPM, such as at least 4000 RPM.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method for operating a hybrid-electric gas turbine engine comprising: controlling a rotational speed of a shaft at least in part with a fuel flow control circuit operable with a fuel delivery system of the hybrid-electric propulsion engine; receiving data indicative of an actual rotational speed of the shaft; calculating an error between the actual rotational speed of the shaft and a commanded rotational speed of the shaft; providing the calculated error to an electric machine control circuit operable with an electric machine of the hybrid-electric propulsion engine, the electric machine drivingly coupled to the shaft; and modifying a torque on the shaft from the electric machine with the electric machine control circuit based on the calculated error.

The method of one or more of these clauses, wherein the shaft is a low-pressure shaft of the gas turbine engine.

The method of one or more of these clauses, wherein the gas turbine engine further includes a rotor assembly coupled to and driven by the shaft.

The method of one or more of these clauses, wherein the fuel flow control circuit operates at a first frequency, wherein the electric machine control circuit operates at a second frequency, and wherein the second frequency is higher than the first frequency.

The method of one or more of these clauses, wherein the second frequency is at least five times faster than the first frequency.

The method of one or more of these clauses, wherein the second frequency is at least about 10 times faster than the first frequency.

The method of one or more of these clauses, wherein modifying the torque on the shaft from the electric machine comprises adding torque to the shaft from the electric machine.

The method of one or more of these clauses, modifying the torque on the shaft from the electric machine comprises adding between 5 hp and 30 hp to the shaft with the electric machine.

The method of one or more of these clauses, wherein receiving data indicative of the actual rotational speed of the shaft comprises receiving data indicative of a fuel flow to the hybrid electric gas turbine engine, a rotational speed parameter of a rotor assembly coupled to and driven by the shaft, a rotational speed parameter of the shaft, a torque applied to a rotor shaft of the rotor assembly, a rotational speed parameter of a high-pressure system of the hybrid electric gas turbine engine, or a combination thereof.

The method of one or more of these clauses, wherein controlling the rotational speed of the shaft at least in part with the fuel flow control circuit further comprises: providing the calculated error to the fuel flow control circuit operable with a fuel delivery system of the hybrid-electric propulsion engine; and modifying a fuel flow to the hybrid electric gas turbine engine with the fuel flow circuit based on the calculated error.

The method of one or more of these clauses, wherein the electric machine control circuit comprises a multiple input, single output controller configured to receive the calculated error and provide a power command output, the multiple input, single output controller configured to receive the calculated error and a motor power feedback signal and further configured to provide a power command to control a power of the electric machine.

The method of one or more of these clauses, wherein the electric machine control circuit comprises a single input, single output controller configured to receive the calculated error output provide a power command to control a power of the electric machine.

The method of one or more of these clauses, wherein the gas turbine engine is a unducted rotor turbofan engine.

The method of one or more of these clauses, wherein the gas turbine engine is a single unducted rotor turbofan engine.

The method of one or more of these clauses, further comprising rotating a rotor assembly with the shaft at a rotational speed defining a variance of less than ±0.005%.

The method of one or more of these clauses, further comprising rotating a rotor assembly with the shaft at a rotational speed defining a variance of less than ±0.002%.

A controller for a gas turbine engine comprising memory and one or more processors, the memory storing instructions that when executed by the one or more processors perform the following control steps: control a rotational speed of a shaft at least in part with a fuel flow control circuit operable with a fuel delivery system of the hybrid-electric propulsion engine; receive data indicative of an actual rotational speed of the shaft; calculate an error between the actual rotational speed of the shaft and a commanded rotation speed of the shaft; provide the calculated error to an electric machine control circuit operable with an electric machine of the hybrid-electric propulsion engine, the electric machine drivingly coupled to the shaft; and modify a torque on the shaft from the electric machine with the electric machine control circuit based on the calculated error.

The controller of one or more of these clauses, wherein the fuel flow control circuit is configured to operate at a first frequency, wherein the electric machine control circuit is configured to operate at a second frequency, and wherein the second frequency is higher than the first frequency.

The controller of one or more of these clauses, wherein the second frequency is at least five times faster than the first frequency.

The controller of one or more of these clauses, wherein the controller is further configured to modify a fuel flow to the hybrid electric gas turbine engine with the fuel flow circuit based on the calculated error.

The controller of one or more of these clauses, wherein the controller is further configured to perform one or more of the steps of a method of one or more of these clauses.

An aeronautical vehicle including a controller of one or more of these clauses, operable in accordance with a method of one or more of these clauses, or both.

The invention claimed is:

1. A method for operating a hybrid-electric gas turbine engine comprising:
controlling a rotational speed of a shaft at least in part with a fuel flow control circuit operable with a fuel delivery system of the hybrid-electric gas turbine engine;
receiving data indicative of an actual rotational speed of the shaft;
calculating an error between the actual rotational speed of the shaft and a commanded rotational speed of the shaft;
providing the calculated error to an electric machine control circuit operable with an electric machine of the hybrid-electric gas turbine engine, the electric machine drivingly coupled to the shaft; and
modifying a torque on the shaft from the electric machine with the electric machine control circuit based on the calculated error;
wherein the fuel flow control circuit operates at a first frequency, wherein the electric machine control circuit operates at a second frequency, and wherein the second frequency is higher than the first frequency.

2. The method of claim 1, wherein the hybrid-electric gas turbine engine further includes a rotor assembly coupled to and driven by the shaft.

3. The method of claim 1, wherein the second frequency is at least five times faster than the first frequency.

4. The method of claim 1, wherein the second frequency is at least 10 times faster than the first frequency.

5. The method of claim 1, wherein modifying the torque on the shaft from the electric machine comprises adding torque to the shaft from the electric machine.

6. The method of claim 1, modifying the torque on the shaft from the electric machine comprises adding between 5 hp and 30 hp to the shaft with the electric machine.

7. The method of claim 1, wherein receiving data indicative of the actual rotational speed of the shaft comprises receiving data indicative of a fuel flow to the hybrid-electric gas turbine engine, a rotational speed parameter of a rotor assembly coupled to and driven by the shaft, a rotational speed parameter of the shaft, a torque applied to a rotor shaft of the rotor assembly, a rotational speed parameter of a high-pressure system of the hybrid-electric gas turbine engine, or a combination thereof.

8. The method of claim 1, wherein controlling the rotational speed of the shaft at least in part with the fuel flow control circuit further comprises:
providing the calculated error to the fuel flow control circuit operable with the fuel delivery system of the hybrid-electric gas turbine engine; and
modifying a fuel flow to the hybrid-electric gas turbine engine with the fuel flow circuit based on the calculated error.

9. The method of claim 1, wherein the electric machine control circuit comprises a multiple input, single output controller configured to receive the calculated error and provide a power command output, the multiple input, single output controller configured to receive the calculated error and a motor power feedback signal and further configured to provide a power command to control a power of the electric machine.

10. The method of claim 1, wherein the electric machine control circuit comprises a single input, single output controller configured to receive the calculated error output provide a power command to control a power of the electric machine.

11. The method of claim 1, wherein the hybrid-electric gas turbine engine is an unducted rotor turbofan engine.

12. The method of claim 1, further comprising
rotating a rotor assembly with the shaft at a rotational speed defining a variance relative to the commanded rotational speed of less than ±0.005%.

13. The method of claim 1, further comprising
rotating a rotor assembly with the shaft at a rotational speed defining a variance relative to the commanded rotational speed of less than ±0.002%.

14. A controller for a hybrid-electric propulsion engine comprising memory and one or more processors, the memory storing instructions that when executed by the one or more processors perform the following control steps:
control a rotational speed of a shaft at least in part with a fuel flow control circuit operable with a fuel delivery system of the hybrid-electric propulsion engine;
receive data indicative of an actual rotational speed of the shaft;
calculate an error between the actual rotational speed of the shaft and a commanded rotation speed of the shaft;
provide the calculated error to an electric machine control circuit operable with an electric machine of the hybrid-electric propulsion engine, the electric machine drivingly coupled to the shaft; and
modify a torque on the shaft from the electric machine with the electric machine control circuit based on the calculated error;
wherein the fuel flow control circuit is configured to operate at a first frequency, wherein the electric machine control circuit is configured to operate at a second frequency, and wherein the second frequency is higher than the first frequency.

15. The controller of claim 14, wherein the second frequency is at least five times faster than the first frequency.

16. The controller of claim 14, wherein the controller is further configured to modify a fuel flow to the hybrid-electric propulsion engine with the fuel flow circuit based on the calculated error.

17. A method for operating a hybrid-electric gas turbine engine comprising:
controlling a rotational speed of a low-pressure shaft of the hybrid-electric gas turbine engine at least in part with a fuel flow control circuit operable with a fuel delivery system of the hybrid-electric gas turbine engine, wherein the hybrid-electric gas turbine engine further comprises a high-pressure shaft;
receiving data indicative of an actual rotational speed of the low-pressure shaft;
calculating an error between the actual rotational speed of the low-pressure shaft and a commanded rotational speed of the low-pressure shaft;
providing the calculated error to an electric machine control circuit operable with an electric machine of the hybrid-electric gas turbine engine, the electric machine drivingly coupled to the low-pressure shaft;
modifying a torque on the low-pressure shaft from the electric machine with the electric machine control circuit based on the calculated error; and
wherein the fuel flow control circuit is configured to operate at a first frequency, wherein the electric machine control circuit is configured to operate at a second frequency, and wherein the second frequency is higher than the first frequency.

* * * * *